(12) United States Patent
Eder et al.

(10) Patent No.: US 8,945,273 B2
(45) Date of Patent: Feb. 3, 2015

(54) PROCESS AND APPARATUS FOR REDUCING CHARGE MATERIALS CONTAINING IRON ORE OR FOR PRODUCING PIG IRON OR LIQUID PRIMARY STEEL PRODUCTS

(75) Inventors: Thomas Eder, Traun (AT); Robert Millner, Loosdorf (AT); Jan-Friedemann Plaul, Linz (AT); Norbert Rein, Vienna (AT); Karl Zehetbauer, Feldkirchen (AT)

(73) Assignee: Siemens Vai Metals Technologies GmbH (AT)

( * ) Notice: Subject to any disclaimer, the term of this patent is extended or adjusted under 35 U.S.C. 154(b) by 199 days.

(21) Appl. No.: 13/522,477

(22) PCT Filed: Dec. 1, 2010

(86) PCT No.: PCT/EP2010/068615

§ 371 (c)(1),
(2), (4) Date: Sep. 25, 2012

(87) PCT Pub. No.: WO2011/085863

PCT Pub. Date: Jul. 21, 2011

(65) Prior Publication Data

US 2013/0019716 A1    Jan. 24, 2013

(30) Foreign Application Priority Data

Jan. 15, 2010 (AT) .................................. A 49/2010

(51) Int. Cl.
C21B 13/00    (2006.01)

(52) U.S. Cl.
CPC ............. *C21B 13/00* (2013.01); *C21B 13/0033* (2013.01); *C12B 13/004* (2013.01)
USPC .................................. 75/376; 75/489; 75/496

(58) Field of Classification Search
CPC .. C21B 11/08; C21B 13/033; C21B 2100/04; C21B 2100/06
USPC ........................................... 75/489, 376, 496
See application file for complete search history.

(56) References Cited

U.S. PATENT DOCUMENTS 3,799,367 A * 3/1974 Grewer et al. ................. 414/210
4,528,030 A * 7/1985 Martinez Vera et al. ........ 75/496

(Continued)

FOREIGN PATENT DOCUMENTS

CA    2726957       12/2009
CA    2787199 A1    7/2011    .............. C21B 13/00

(Continued)

OTHER PUBLICATIONS

International Search Report and Written Opinion, Application No. PCT/EP2010/068615, 7 pages, Mar. 10, 2011.

(Continued)

*Primary Examiner* — George Wyszomierski
*Assistant Examiner* — Tima M McGuthry Banks
(74) *Attorney, Agent, or Firm* — Ostrolenk Faber LLP

(57) ABSTRACT

A process and an apparatus for reducing charge materials containing iron ore or for producing pig iron or liquid primary steel products in a smelting unit are provided, the charge materials being at least partially reduced in at least one reduction unit by means of a reducing gas and optionally at least some of the at least partially reduced charge materials being melted in a smelting unit while supplying coal or coke and gas containing oxygen, while simultaneously forming the reducing gas, and the reducing gas or a reducing gas generated externally being supplied to the reduction unit. In the event of an interruption in the production of pig iron or primary steel products, the at least one reduction unit is emptied and the at least partially reduced charge materials are introduced into at least one vessel and kept under a non-oxidizing shielding gas atmosphere.

11 Claims, 4 Drawing Sheets

(56) References Cited

U.S. PATENT DOCUMENTS

| | | | | |
|---|---|---|---|---|
| 5,192,486 | A | 3/1993 | Whipp | 266/156 |
| 5,989,308 | A | 11/1999 | Kepplinger et al. | 75/436 |
| 6,074,456 | A * | 6/2000 | Freytag et al. | 75/436 |
| 6,241,804 | B1 * | 6/2001 | Rosenfellner | 75/488 |
| 2003/0041690 | A1* | 3/2003 | Zirngast | 75/446 |
| 2006/0162499 | A1* | 7/2006 | Lee et al. | 75/560 |
| 2011/0138965 | A1 | 6/2011 | Boehm et al. | 75/505 |

FOREIGN PATENT DOCUMENTS

| | | | | |
|---|---|---|---|---|
| DE | 2208382 | B1 | 6/1973 | B65D 90/64 |
| DE | 19928935 | A1 | 2/2000 | C21B 13/00 |
| RU | 2304620 | C2 | 8/2007 | |
| WO | 01/14598 | A1 | 3/2001 | C21B 13/02 |
| WO | 2006/111574 | A1 | 10/2006 | C21B 13/02 |
| WO | 2009/146982 | A1 | 12/2009 | C21B 13/00 |
| WO | WO 2009144521 A2 * | | 12/2009 | C12B 13/14 |
| WO | 2011/085863 | A1 | 7/2011 | C21B 13/00 |

OTHER PUBLICATIONS

Russian Federation Notice of Allowance, dated May 23, 2014, issued in corresponding Russian Patent Application No. 2012134750/02(055666). Total 9 pages.

* cited by examiner

PROCESS AND APPARATUS FOR REDUCING CHARGE MATERIALS CONTAINING IRON ORE OR FOR PRODUCING PIG IRON OR LIQUID PRIMARY STEEL PRODUCTS

CROSS-REFERENCE TO RELATED APPLICATIONS

This application is a U.S. National Stage Application of International Application No. PCT/EP2010/068615 filed Dec. 1, 2010, which designates the United States of America, and claims priority to AT Patent Application No. A49/2010 filed Jan. 15, 2010. The contents of which are hereby incorporated by reference in their entirety.

TECHNICAL FIELD

This disclosure relates to a process and an apparatus for reducing charge materials containing iron ore or for producing pig iron or liquid primary steel products in a smelting unit, in particular a melter gasifier, the charge materials being at least partially reduced in at least one reduction unit, in particular a fluidized-bed reactor, by means of a reducing gas and optionally at least some of the at least partially reduced charge materials being melted in a melter gasifier or in a blast furnace while supplying coal or coke and gas containing oxygen, while simultaneously forming the reducing gas, and the reducing gas or a reducing gas generated in an external process, in particular in a re-formation process, being supplied to the reduction unit.

BACKGROUND

It is known that hot reduced material, such as for example iron oxides, should be kept under shielding gas during storage in order to avoid re-oxidation processes. Various devices are known for this, providing a shielding of air or else a flushing with a shielding gas.

With processes for reducing charge materials and with smelting reduction processes there is the problem that, whenever there are disturbances of the process or planned shutdowns, the charge materials have to be removed from the units in order that they do not cool down and solidify, that is to say that the charge materials do not solidify in the process reactors. Furthermore, before planned shutdowns, the charge material must be removed to allow maintenance of the installation to be carried out. On account of the size of the installations, in the case of a shutdown it is usually necessary to deal with large amounts of hot charge materials.

SUMMARY

In one embodiment, a method is provided for interrupting a reduction process for charge materials containing iron ore or a production process for pig iron or liquid primary steel products, the charge materials being at least partially reduced in at least one reduction unit, in particular a reduction shaft or a fluidized-bed reactor, by means of a reducing gas and optionally at least some of the at least partially reduced charge materials being smelted in a smelting unit, in particular a melter gasifier or a blast furnace, while supplying coal or coke and gas containing oxygen, while simultaneously forming the reducing gas, and the reducing gas formed thereby or a reducing gas generated externally, in particular in a re-formation process, being supplied to the reduction unit, wherein, when there is an interruption in the reduction process or the production of pig iron or primary steel products, in particular when there is a shutdown of the process, the at least one reduction unit is emptied, the at least partially reduced charge materials being introduced into at least one vessel, in particular a bunker or a further reduction unit, and kept under a non-oxidizing shielding gas atmosphere.

In a further embodiment, the emptied charge materials are cooled to a temperature, in particular below 150° C., at which no re-oxidation of the charge materials occurs. In a further embodiment, for loosening the material and/or for inertizing and/or for at least partial cooling, the charge materials in the vessel are flushed with a shielding gas, in particular nitrogen. In a further embodiment, the charge materials are discharged from the vessel and thereby cooled, in particular by means of cooling screws. In a further embodiment, the cooled charge materials are brought out of the vessel, in particular pneumatically by means of a carrier gas, into a store for storing the cooled charge materials in air, so that they can be returned to the process in a metered manner after the interruption is ended. In a further embodiment, the charge materials are brought into the vessel under the operating pressure of the reduction unit. In a further embodiment, the pressure in the vessel is lowered before a discharge of the charge materials to a differential pressure of at least 0.1 bar, in particular at least 0.5 bar, in relation to the reduction unit. In a further embodiment, the reducing gas that is introduced into the vessel together with the charge material is introduced into a charging container for charging reduced charge materials into a briquetting device. In a further embodiment, the charge materials are introduced alternately into at least two vessels. In a further embodiment, the transport of the charge materials from the reduction unit into the vessel takes place gravitationally and/or pneumatically, using the reducing gas from the reduction unit as a carrier gas.

In another embodiment, an apparatus for reducing charge materials containing iron ore or for producing pig iron or liquid primary steel products comprises at least one reduction unit, in particular a reduction shaft or a fluidized-bed reactor, for the at least partial reduction of charge materials containing iron ore by means of a reducing gas, and optionally comprising a smelting unit, in particular a melter gasifier or a blast furnace, in which at least some of the at least partially reduced charge materials can be melted in the melter gasifier while supplying coal or coke and gas containing oxygen, while simultaneously forming the reducing gas, it being possible for the reducing gas formed thereby or a reducing gas generated in an external process, in particular in a re-formation process, to be supplied to the reduction unit by way of a reducing gas line, wherein at least one vessel, in particular a bunker or a further reduction unit, is provided, into which vessel the at least one reduction unit can be emptied in the case of an interruption in the reduction process or the production of pig iron or primary steel products, in particular when there is a shutdown of the process, inertizing devices being provided in the vessel, so that the at least partially reduced charge materials can be introduced and kept under a non-oxidizing shielding gas atmosphere, the inertizing devices being formed by a multiplicity of shielding gas connections in the vessel, so that the charge materials can be inertized and/or fluidized and/or cooled.

In a further embodiment, at least two vessels are provided, so that they can be charged alternately with charge materials. In a further embodiment, the vessel has at least one cooling screw for the cooling and metered discharge of the charge materials. In a further embodiment, a device for pneumatically conveying the charge materials out of the vessel is provided, connecting the vessel to a store for storing the cooled charge materials in air. In a further embodiment, 2 to 6, in particular 4, reduction units, in particular fluidized-bed reactors, are provided, arranged in a cascade, which units are respectively connected to one another by way of a reducing gas line, a transporting line for the charge materials and a separate emptying line, so that reducing gas and charge materials can flow in countercurrent, it being possible when there is a shutdown of the process for the lowest-lying reduction unit to be emptied first, by way of a run-off, and then the next-higher reduction unit into the lower-lying reduction unit, by way of the separate emptying line. In a further embodiment, 2 to 6, in particular 4, reduction units, in particular fluidized-bed reactors, are provided, arranged in a cascade, which units are respectively connected to one another by way of a reducing gas line and a transporting line for the charge materials, so that reducing gas and charge materials can flow in countercurrent, the reduction units being respectively connected to a common discharge line for emptying the reduction units and the discharge line being connected to the vessel. In a further embodiment, the vessel is connected by way of a waste gas line to a charging container for charging reduced charge materials into a briquetting device, so that the reducing gas removed from the vessel can be supplied to the charging container. In a further embodiment, the vessel is connected by way of a waste gas line to a device for cleaning the gas removed from the vessel, in particular a scrubber or a device for dry dust separation.

BRIEF DESCRIPTION OF THE DRAWINGS

Example embodiments will be explained in more detail below with reference to figures, in which.

DETAILED DESCRIPTION

Figure 1:
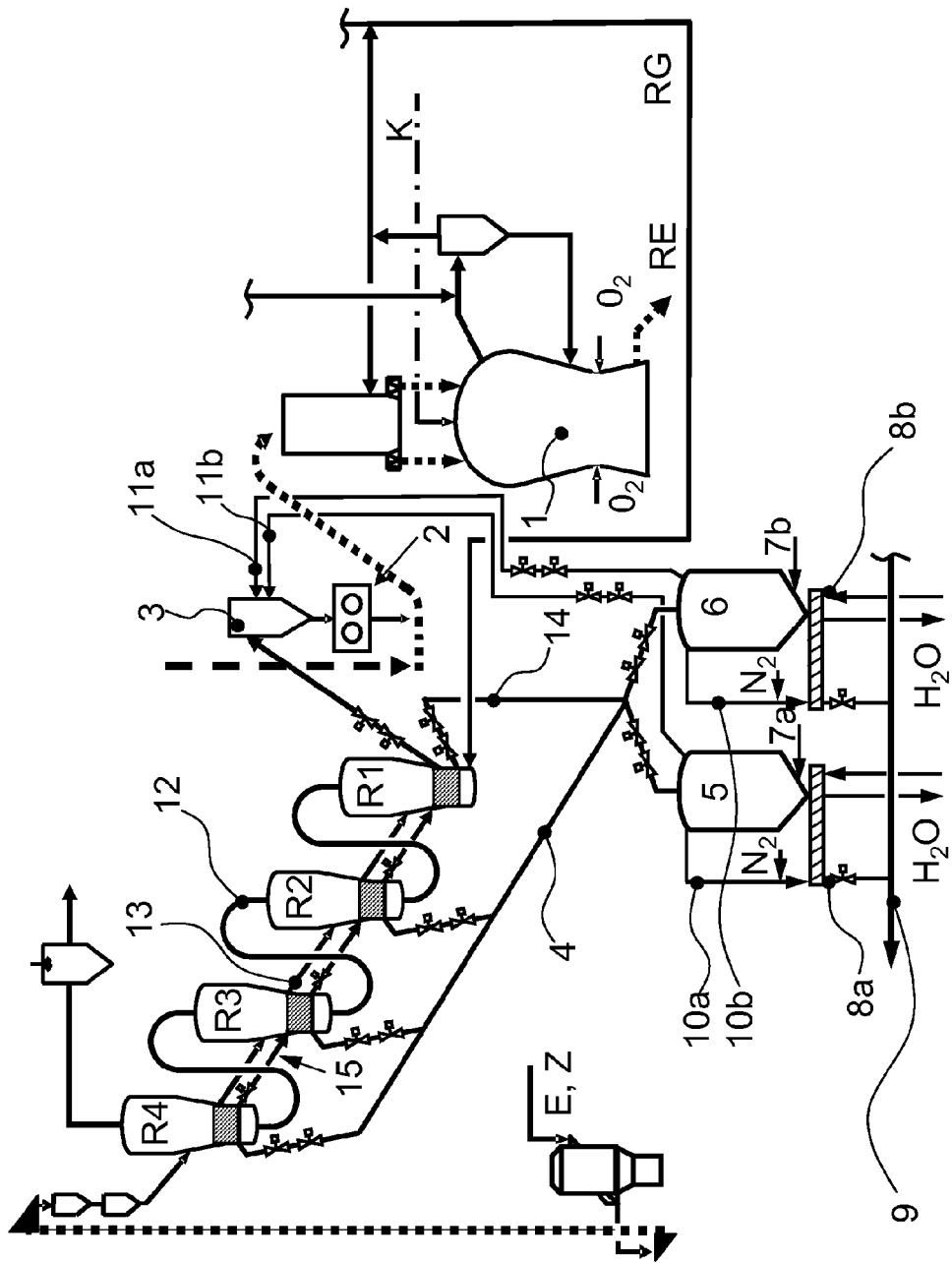
FIG. 1 shows an example installation for producing pig iron or liquid primary steel products in connection with the charge container, according to one embodiment.

Some embodiments provide a process and an apparatus that make it possible for a reduction or smelting reduction process to be interrupted quickly and at low cost.

When there is an interruption in the reduction process or the production of pig iron or primary steel products, as occurs for example when there is a shutdown of the process, some embodiments provide that the at least one reduction unit is emptied. However, it is also conceivable that only a partial production stream is isolated. The at least partially reduced, and usually hot, charge materials, such as fine-grained iron ores or iron ores in lump form, are introduced into at least one vessel, such as for example a bunker or a further reduction unit, and kept under a non-oxidizing shielding gas atmosphere. It is ensured by the shielding gas atmosphere that there is no renewed oxidation of the already at least partially reduced charge materials. Consequently, the state of reduction of the charge materials can be maintained even in the case of an interruption of the process for producing pig iron or primary steel products and they can be passed on for subsequent use after the shutdown is ended, such as for example when the process is continued. This makes it possible to dispense with complex treatments of the charge materials, in particular a stable operating state can be quickly achieved once the process is continued. Furthermore, in the case of unplanned shutdowns, the process can be stopped and the reduction unit emptied at lower cost. This makes it possible for the cooling of the installation to take less time, and consequently for there to be reduced downtimes as a result of work on the installation. Furthermore, the costs for processing the charge materials are reduced, since they no longer have to be cooled in a water bath and subsequently treated in a known customary manner. Eliminating this water bath cooling dispenses with the need for processing the resultant slurries and the installations necessary for the subsequent treatment.

According to one embodiment of the process, the emptied charge materials are cooled to a temperature, in particular below 150° C., at which no re-oxidation of the charge materials occurs. Since oxidation processes occur more quickly with increasing temperature, renewed oxidation can be largely suppressed by cooling, even during storage in air, since the oxidation processes scarcely occur, or only very slowly.

Some embodiments of the process provide that, for loosening the material and/or for inertizing and/or for at least partial cooling, the charge materials in the vessel are flushed with a shielding gas, in particular nitrogen. When storing hot, partially reduced charge materials, which usually have a lumpy or granular structure, agglomerates may form. In order to avoid such unwanted agglomerates, it is possible to loosen the charge materials by the shielding gas, while at the same time also being able to achieve a cooling of the charge materials. The inertization has the effect of avoiding oxidation.

In some embodiments of the process, the charge materials are cooled when they are discharged from the vessel, in particular by means of cooling screws. The charge materials are consequently first removed from the reduction unit and stored in the vessel under a shielding gas atmosphere. Depending on the duration of the interruption of the process, the charge materials may be temporarily stored whilst warm or else cooled in a controlled manner. The cooling may take place during the discharge from the vessel by means of cooling screws. The charge materials are passed by means of a screw through a (water-)cooled tubular housing, in which the (water-)cooled screw is arranged, thereby intensely cooled and transported out of the vessel. The cooling has the effect of reliably avoiding re-oxidation of the charge materials, it being possible to adapt the cooling rate and the final temperature as required.

In some embodiments, the cooled charge materials are brought out of the vessel, in particular pneumatically by means of a carrier gas, into a store for storing the cooled charge materials. The pneumatic transport of the charge materials that have been discharged from the vessel is a particularly simple and low-cost solution, it being possible for example to use shielding gas from the vessel or else some other process gas or mixtures thereof as the carrier gas.

In one embodiment, the charge materials are brought into the metallurgical vessel under the operating pressure of the reduction unit. The operating pressure may be used for transporting the charge materials into the vessel, it being possible for the pressure in the vessel to be set correspondingly lower than the operating pressure. However, it is also conceivable to set the same pressure in the vessel and in the reduction unit and to achieve the discharge of the charge materials by means of gravitational force.

In one embodiment, the pressure in the vessel is lowered before a discharge of the charge materials, in particular to a differential pressure of at least 0.1 bar, in particular to at least 0.5 bar, in relation to the reduction unit. The pressure in the vessel can therefore be adapted during filling from the reduction unit correspondingly to the operating pressure thereof and be lowered again before the discharge of the charge materials from the vessel. Consequently, the pressure difference in the vessel with respect to the surroundings into which the charge materials are discharged can be set.

In one embodiment, the reducing gas that is introduced into the vessel together with the charge material is introduced into a charging container for charging reduced charge materials into a briquetting device. Units in reduction or smelting reduction installations may require charge containers in which the charge materials are stored before they are charged into the respective unit and which also serve for adapting the pressure to the operating pressure of the unit. The surplus reducing gas may be passed from the vessel into the charging container. It is possible by this measure to use the devices that are in connection with the charging container and with the briquetting device for handling reducing gas from the smelting unit. Alternatively, a dedicated gas treatment may also be carried out, for example by means of a scrubber or a device for dry dust separation.

According to one embodiment, the charge materials are introduced alternately into at least two vessels. This makes alternating use of the vessels possible, so that for example one vessel can be emptied while the other vessel is being filled. However, it is also possible to provide two or more vessels, which may if required be filled simultaneously, so that very quick removal of the charge materials from the reduction unit or units is made possible.

Some embodiments provide that the transport of the charge materials from the reduction unit into the vessel takes place gravitationally and/or pneumatically, using the reducing gas from the reduction unit as a carrier gas. If required, the rate at which the charge materials are brought out of the reduction unit into the vessel can in this case be set, it being possible for the transport to be set by way of the pressure of the reducing gas and the pressure difference between the reduction unit and the vessel.

In some embodiments, an apparatus for reducing charge materials or for producing pig iron or liquid primary steel products comprises at least one reduction unit, such as for example a reduction shaft or a fluidized-bed reactor, for the at least partial reduction of charge materials containing iron ore by means of a reducing gas, and optionally a smelting unit, in particular a melter gasifier or a blast furnace, it being possible for at least some of the at least partially reduced charge materials to be melted in the melter gasifier while supplying coal or coke and gas containing oxygen, while simultaneously forming the reducing gas, and it being possible for the reducing gas formed thereby or a reducing gas generated in an external process, in particular a re-formation process, to be supplied to the reduction unit by way of a reducing gas line. At least one vessel is provided, in particular a bunker or a further reduction unit, into which the at least one reduction unit can be emptied in the case of an interruption of the reduction process or the production of pig iron or primary steel products, in particular when there is a shutdown of the process. Inertizing devices are provided in the vessel, so that the at least partially reduced charge materials can be introduced and kept under a non-oxidizing shielding gas atmosphere. The inertizing devices are formed by a multiplicity of shielding gas connections in the vessel, so that the charge materials can be inertized and/or fluidized and/or cooled. The choice of the type of vessel depends substantially on the production capacity of the installation for reducing charge materials containing iron ore or for producing pig iron or liquid primary steel products, it being possible to make allowance for the needs when there are shutdowns of the process. Usually, the capacity of the vessel or vessels is chosen such that complete emptying is possible in a short time, a duration for the complete emptying of the reduction units of approximately half an hour to 4 hours being considered to be technically realistic for example. The entire volume of the one vessel or of all the vessels is dimensioned such that at least the charge materials from one reduction unit and at most from all the reduction units can be accommodated.

According to one embodiment, at least two vessels are provided, so that they can be charged alternately with charge materials. This allows, for example, one vessel to be filled while the other is being emptied. Simultaneous filling of the vessels is likewise possible, this allowing even quicker emptying of the reduction units.

In one embodiment, the vessel has at least one cooling screw for the cooling and metered discharge of the charge materials from the vessel. Cooling screws have screw-like conveying devices, which are arranged in a coolable, usually water-cooled, substantially tubular housing. The high specific surface area and good mixing of the charge materials mean that cooling screws meet the particular requirements concerning cooling of hot, reduced iron oxides. The length of the screws, the form of the screws, the diameter, the operating speeds and other parameters can be adapted as required, so that a specifically selected cooling rate can be ensured for a defined conveying volume. Similarly, the number of cooling screws per vessel is adapted as required. Typically, each vessel has 1 to 6 cooling screws. The design is such that complete emptying of the vessel can be ensured in approximately 4 to 16 hours.

According to a particular embodiment, a device for pneumatically conveying the charge materials out of the vessel is provided, connecting the vessel to a store for storing the cooled charge materials in air. The pneumatic conveyance allows simple and low-cost transport, the elimination of mechanical conveying devices making it possible to avoid wearing of transporting devices that would be caused by the highly abrasive charge materials.

According to some embodiments, 2 to 6, in particular 4, reduction units, in particular fluidized-bed reactors, are provided, arranged in a cascade, which units are respectively connected to one another by way of a reducing gas line, a transporting line for the charge materials and a separate emptying line, so that reducing gas and charge materials can flow in countercurrent, it being possible when there is a shutdown of the process for the lowest-lying reduction unit R1 to be emptied first, by way of a run-off, and then the next-higher reduction unit into the lower-lying reduction unit, by way of the separate emptying line.

The separate emptying line between the reduction units is formed in such a way that the run-in thereof begins just above the tuyere bottom of the higher-lying reduction unit and, as a result, at least a large part of the bed material can be directed into the lower-lying reduction unit. The separate emptying line between the reduction units may be closed by a valve during normal operation. The charge materials of the lowest-lying reduction unit may, for example, be supplied to a briquetting device. In the case of this refinement, the reduction units assume the role of the vessel, so that the stage-by-stage emptying allows storage and cooling to take place in the downstream reduction unit or units.

According to a further embodiment, 2 to 6, in particular 4, reduction units R1, R2, R3, R4, in particular fluidized-bed reactors, are provided, arranged in a cascade, which units are respectively connected to one another by way of a reducing gas line and a transporting line for the charge materials, so that reducing gas and charge materials can flow in countercurrent, the reduction units being respectively connected to a common discharge line for emptying the reduction units and the discharge line being connected to the vessel or by way of a connecting line to a briquetting installation. This specific solution allows emptying of the reduction units by way of the common discharge line into the vessel or into a briquetting installation. In both cases, cooling is subsequently possible.

According to a further embodiment, the vessel is connected by way of a waste gas line to a charging container for charging reduced charge materials into a briquetting device, so that the reducing gas removed from the vessel can be supplied to the charging container. The waste gas line allows the reducing gas to be supplied to the charging container, and thus to be treated in a device that is usually present for cleaning the reducing gas. There is therefore no need for an additional device.

In one embodiment, the vessel is connected by way of a waste gas line to a device for cleaning the gas removed from the vessel, in particular a scrubber. If required, a scrubber or a device for dry dust separation may be provided, making it possible for the gas removed from the vessel to be cleaned, it being possible for example for solids, dusts etc. to be separated from the gas and the clean gas to be passed on for renewed use in the reduction process.

FIG. 1 shows a smelting unit 1, such as for example a melter gasifier, in which charge materials E, which are at least partially reduced, such as for example fine ore or fine iron ore, are melted while supplying carbon carriers, such as for example coal and/or coke K, a reducing gas being formed and introduced into the row of reduction units R1 to R4 that are connected in series. The reducing gas thereby flows in countercurrent in relation to the charge materials E to be reduced and optionally additions Z, which are mixed and dried before being charged into the reduction unit R4. The devices for cleaning the reducing gas, with which the reducing gas generated in the smelting unit is cleaned and the temperature thereof is set before it is introduced into the reduction units, are known in the art and thus not shown in any more detail.

The at least partially reduced charge materials may be made into lump form in a hot compacting device 2 and, usually whilst still hot, introduced into the charge container 3 and melted in the smelting unit 1 into pig iron RE.

In addition to the reducing gas lines 12 and the transporting line 13, which connect the reduction units to one another, a common discharge line 4 is provided, by way of which charge materials can be discharged from the reduction units R4, R3 and R2 into at least one vessel. In addition, a discharge line from the reduction unit R1 into a vessel is provided. FIG. 1 shows two vessels 5 and 6, which are provided for alternating operation. Alternatively, the vessels 5 and 6 may also be arranged and connected in such a way that they can also receive charge materials from the reduction units simultaneously. The vessels 5 and 6 are respectively equipped with inertizing devices 7a, 7b, so that the charge materials can be flushed or cooled with shielding gas, such as for example nitrogen, or mixtures of shielding gases.

FIG. 1 shows a further variant of the apparatus according to one embodiment. This provides a separate emptying line 15, which is respectively arranged such that the run-in thereof begins just above the tuyere bottom of the higher-lying reduction unit and, as a result, at least a large part of the bed material can be directed into the lower-lying reduction unit. This separate emptying line 15 may either be provided instead of the common discharge line 4 or else together with it.

The vessels 5, 6 are respectively provided with one or more screw coolers 8a, 8b, which bring about a cooling of the charge materials during the discharge of the charge materials from the vessel. This may take place by a water-cooled housing in which at least one discharge screw with (water-)cooled screw coils is arranged. The discharged charge materials may be introduced into a carrier gas stream in a device for pneumatic conveyance 9, and thereby brought into a store. A pressure equalization between the screw coolers 8a, 8b and the vessels 5, 6 is established by way of lines 10a, 10b and the conveying gas is introduced. Alternatively, it is also conceivable to use other cooling devices in order to cool the charge materials after discharge from the vessels.

The discharge of the charge materials and the pneumatic transport may take place in a closed system, so that no environmental effects occur, such as for example emissions.

Alternatively, the charge materials may also be supplied from the reduction unit R1 to a briquetting device 2.

The reducing gases introduced into the vessel 5, 6 may be discharged by way of waste gas lines 11a and 11b and supplied to the charge container 3 of the briquetting device 2 in a controlled manner. For this purpose, valves and adjusting elements that are not represented any more specifically are provided in the waste gas lines 11a, 11b.

Figure 2:
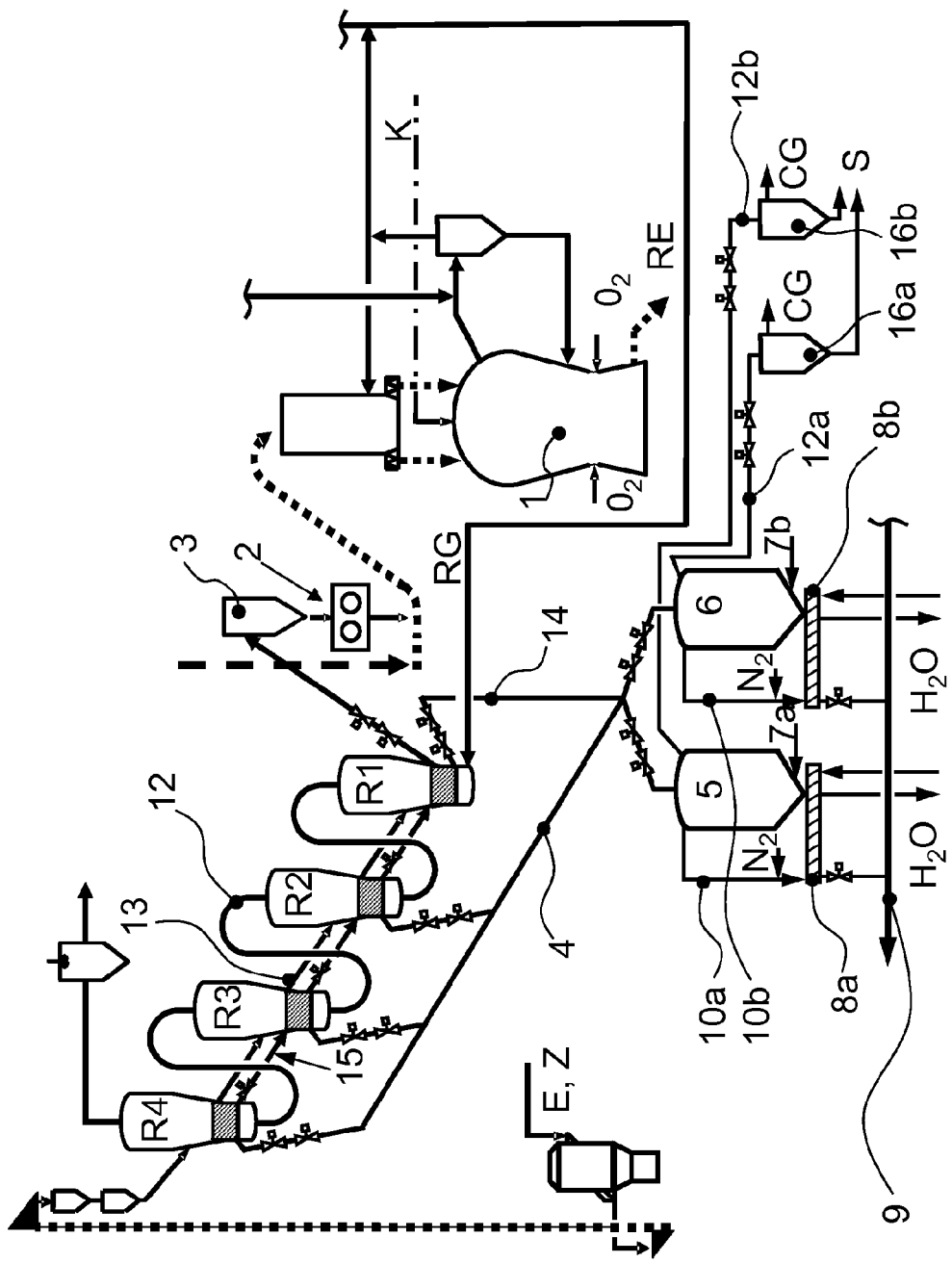
FIG. 2 shows an example installation for producing pig iron or liquid primary steel products with scrubbers, according to one embodiment.

Alternatively, according to FIG. 2, the reducing gases may be supplied by way of waste gas lines 12a, 12b to scrubbers 16a, 16b, the cleaning of the gas taking place while a scrubbing liquid is added. The cleaned gas CG can be passed on for renewed use in the process for producing pig iron or primary steel products; the separated dust, which occurs as slurry S, can be passed on for further processing.

Figure 3:
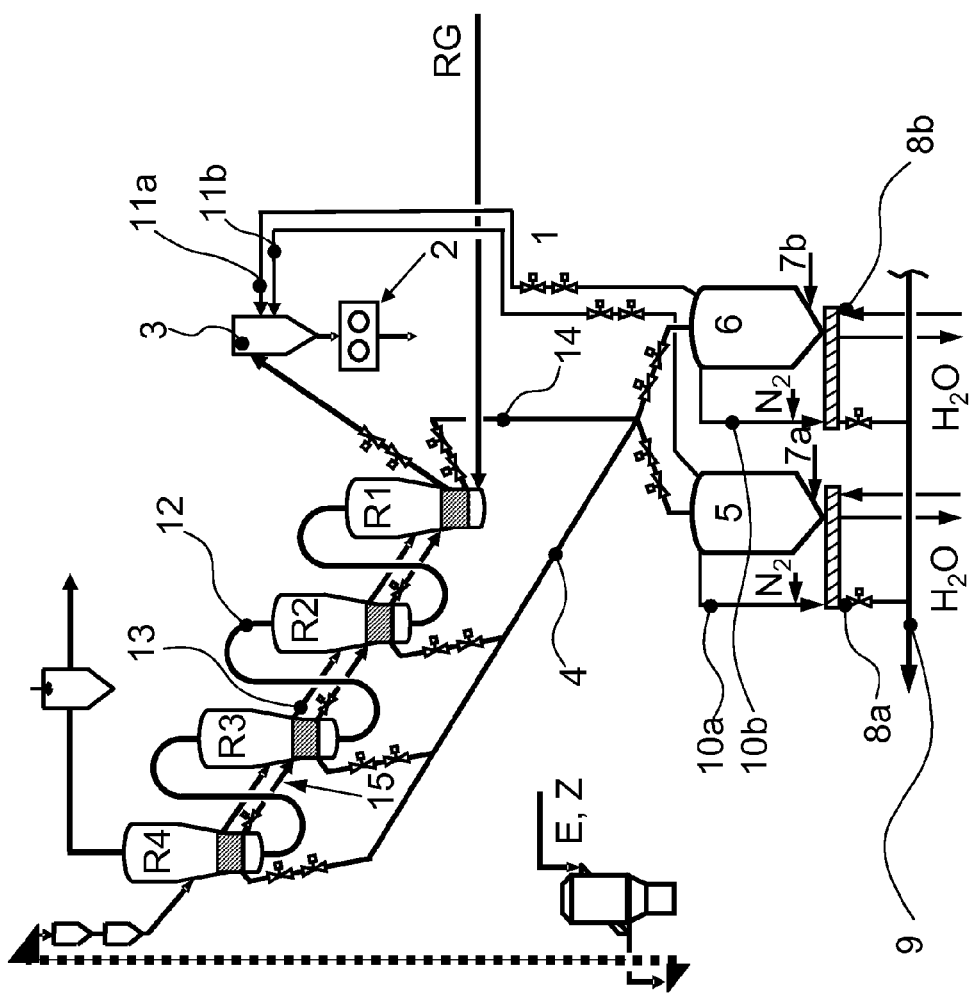
FIG. 3 shows an example installation for reducing charge materials containing iron ore in connection with the charge container, according to one embodiment.

FIG. 3 shows by way of example an installation according to an embodiment for reducing charge materials containing iron ore with connection to the charge container. Reducing gas, which is optionally generated by mixing cleaned top gas and gas from a gas reformer, an optional $CO_2$ separating device and a cooling device, is supplied to a reduction unit R1.

Figure 4:
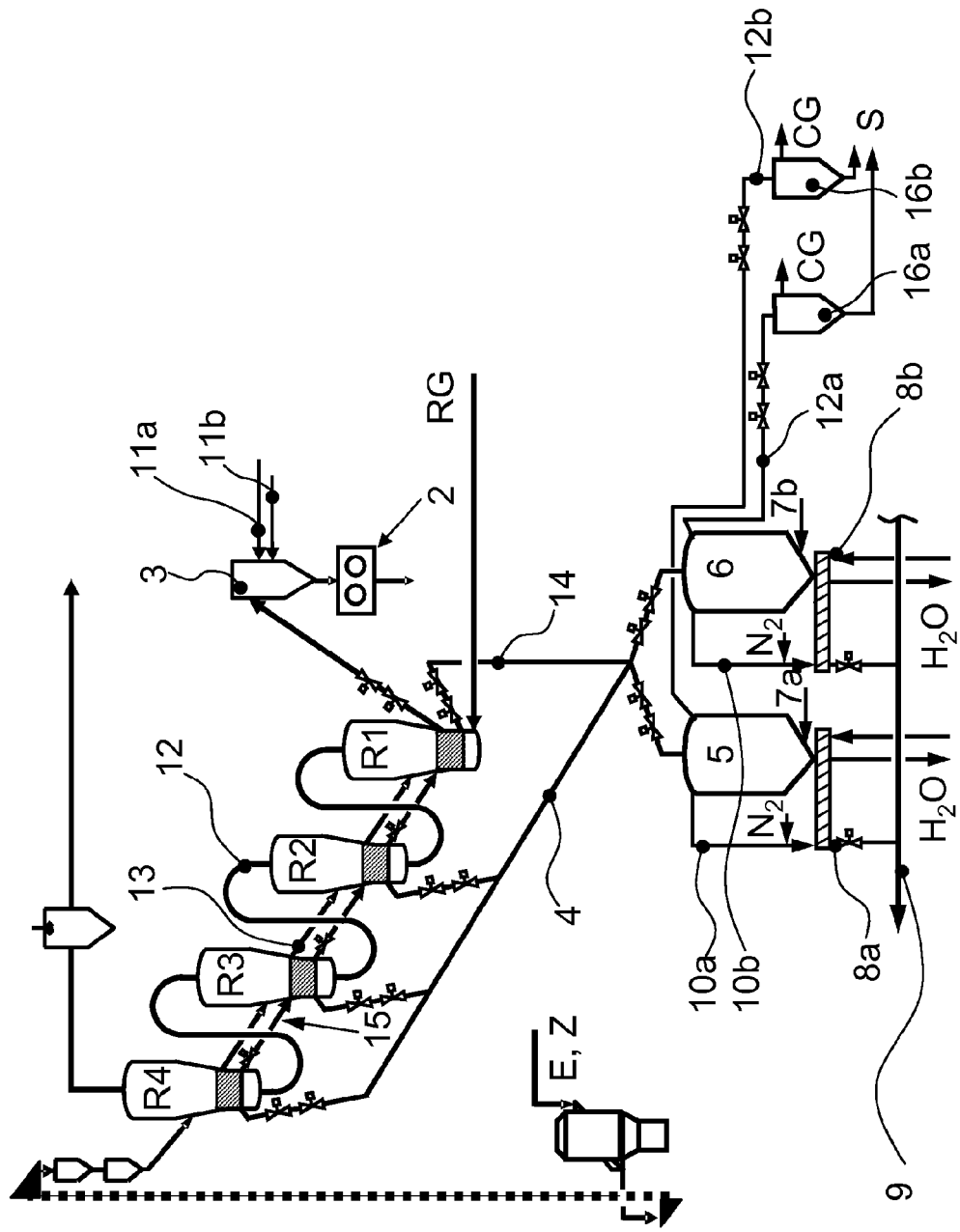
FIG. 4 shows an example installation for reducing charge materials containing iron ore with scrubbers, according to one embodiment.

FIG. 4 shows an installation according to an embodiment for reducing charge materials containing iron ore with scrubbers 16a and 16b. Instead of the scrubbers, devices for dry cleaning, in particular for dry dust separation, could also be used.

What is claimed is:

1. A method for interrupting a reduction process for charge materials containing iron ore or a production process for pig iron or liquid primary steel products, comprising:
    at least partially reducing the charge materials in at least one reduction unit by at least a reducing gas, while simultaneously forming the reducing gas,
    supplying to the reduction unit the reducing gas or an externally produced reducing gas,
    in response to an interruption in one of the reduction process, the production of pig iron, and the production of primary steel products:
    emptying the at least one reduction unit,
    introducing the at least partially reduced charge materials into at least one vessel, and
    maintaining the at least partially reduced charge materials in the at least one vessel under a non-oxidizing shielding gas atmosphere.

2. The method of claim 1, wherein the emptied charge materials are cooled to a temperature at which no re-oxidation of the charge materials occurs.

3. The method of claim 1 wherein, the charge materials in the vessel are flushed with nitrogen for one of the following selected from a group consisting of loosening the material, inertizing, and at least partial cooling.

4. The method of claim 1, wherein the charge materials are discharged from the vessel and thereby cooled using cooling screws.

5. The method of claim 4, wherein the cooled charge materials are pneumatically brought out of the vessel using a carrier gas into a store for storing the cooled charge materials in air, such that they can be returned to the process in a metered manner after the interruption is ended.

6. The method of claim 4, wherein the pressure in the vessel is lowered before a discharge of the charge materials to a differential pressure of at least 0.1 bar in relation to the reduction unit.

7. The method of claim 1, wherein the charge materials are brought into the vessel under the operating pressure of the reduction unit.

8. The method of claim 1, wherein reducing gas and the partially reduced charge materials are introduced into a charging container for charging reduced charge materials into a briquetting device.

9. The method of claim 1, wherein the partially reduced charge materials are introduced alternately into one of the two vessels.

10. The method of claim 1, wherein introducing of the partially reduced charge materials from the reduction unit into the vessel takes place gravitationally and/or pneumatically, using the reducing gas from the reduction unit as a carrier gas.

11. The method of claim 1, comprising smelting some of the at least charge materials in a smelting unit, while supplying coal or coke and gas containing oxygen, while simultaneously forming the reducing gas.

\* \* \* \* \*